W. B. COWLES.
AUTOMATIC DIE ROUTING DUPLICATOR FOR DIE ROLLS.
APPLICATION FILED JULY 26, 1918.
1,434,683.
Patented Nov. 7, 1922.
2 SHEETS—SHEET 2.
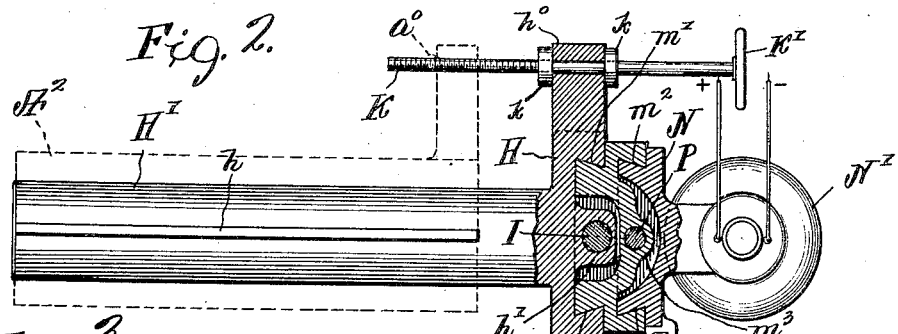
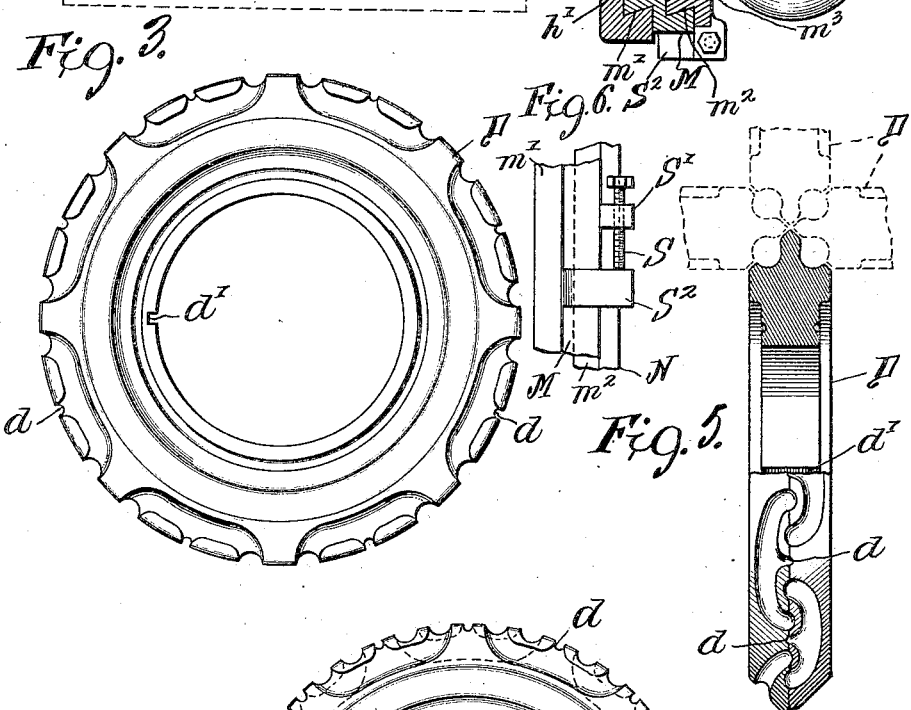
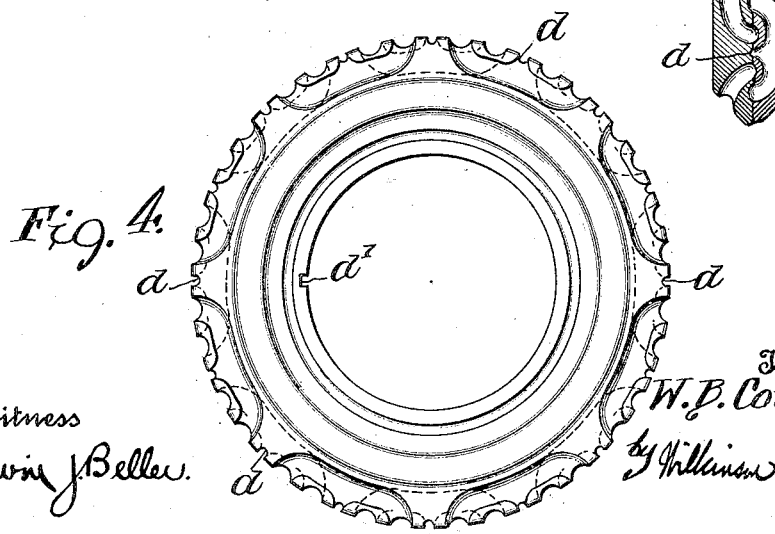
Witness
Edwin J. Beller.
Inventor
W. B. Cowles.
by Wilkinson & Ginsta,
Attorneys.

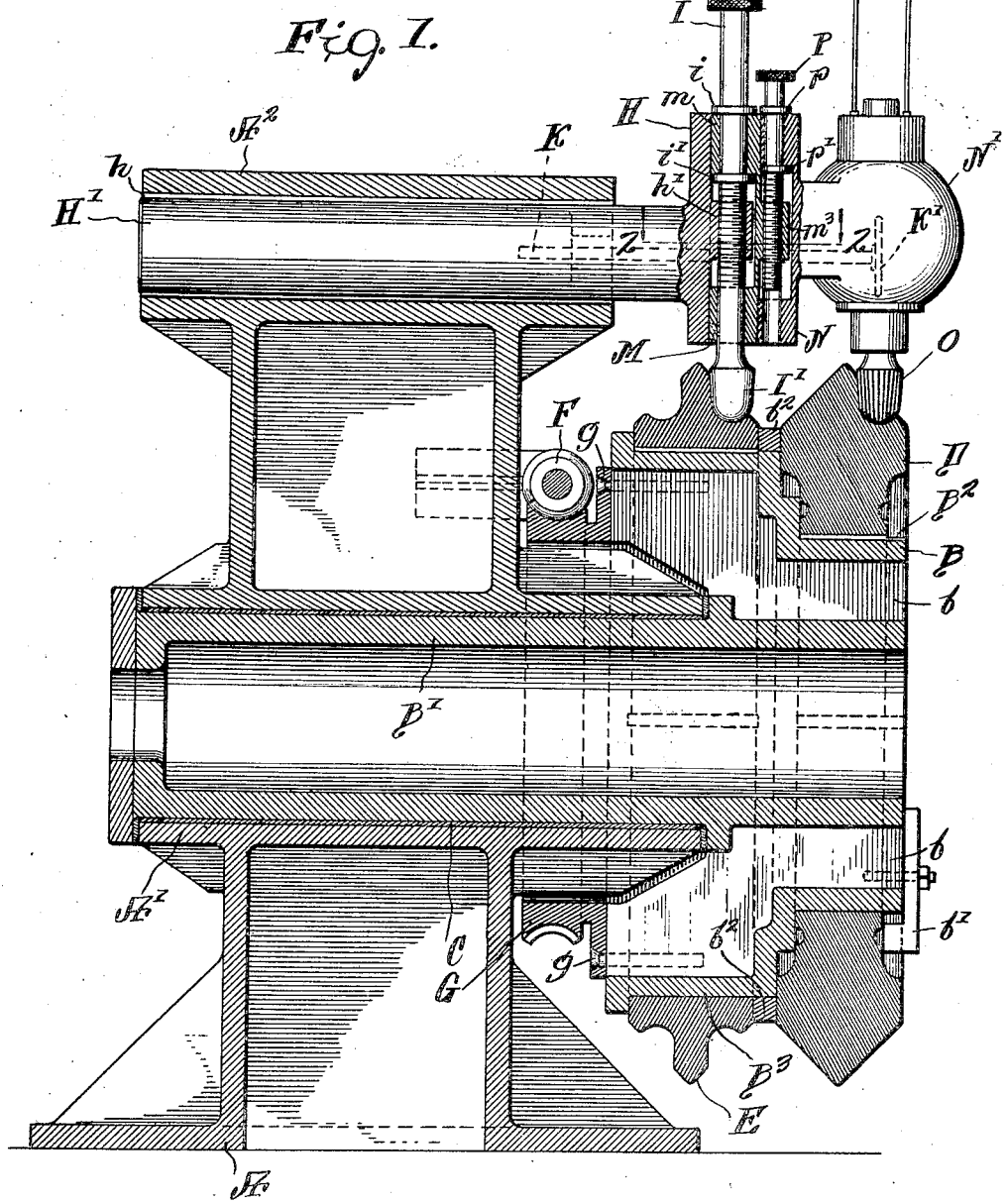

Patented Nov. 7, 1922.

1,434,683

UNITED STATES PATENT OFFICE.

WILLIAM BARNUM COWLES, OF PHILADELPHIA, PENNSYLVANIA, ASSIGNOR TO WELDLESS CHAIN CORPORATION, OF DOVER, DELAWARE, A CORPORATION OF DELAWARE.

AUTOMATIC DIE-ROUTING DUPLICATOR FOR DIE ROLLS.

Application filed July 26, 1918. Serial No. 246,912.

*To all whom it may concern:*

Be it known that I, WILLIAM B. COWLES, a citizen of the United States, residing at Philadelphia, in the county of Philadelphia and State of Pennsylvania, have invented certain new and useful Improvements in Automatic Die-Routing Duplicators for Die Rolls; and I do hereby declare the following to be a full, clear, and exact description of the invention, such as will enable others skilled in the art to which it appertains to make and use the same.

My present invention relates to improvements in mechanism for the manufacture of die-rolls for roll-forgings, and is intended especially to provide a die-roll for rolling steel bars, while hot, into the desired shape.

The invention is intended more especially for cutting the die-rolls adapted for use in the manufacture of weldless steel chain, such as is described, for example, in my applications executed of even date herewith, and entitled respectively:

(1) Weldless stud-link ship-cable shot, Serial No. 245056, filed July 15, 1918.

(2) Improved die-rolling mill for the manufacture of weldless chain, filed July 15, 1918, Serial No. 245057.

(3) Automatic trimming press for manufacturing weldless chain, Serial No. 245926, filed July 20, 1918.

In the manufacture of weldless steel chain by die-rolling a hot cruciform-bar into a chain-bar, it has been demonstrated abroad that the wear and tear on these die-rolls, and the expense and time required to renew them in duplicate properly, is a very serious matter. The turning, boring and keyseating of the die blank can be done well by existing and well known methods and machine tools, but to duplicate the matrices on the periphery of such die-rolls very slow and expensive handwork is now used.

For successful manufacture, interchangeability is required in these die-rolls: It is essential that the various matrices cut into these die-rolls shall be exact duplicates so that a uniform product may be obtained, and so that any die-roll may be renewed without alteration of this uniformity, especially as four of such rolls operate in conjunction to roll-forge the chain-bar.

In order to cut these matrices to the desired dimensions, I provide duplicating apparatus which will be more readily understood after reference to the accompanying drawings, in which similar parts are indicated by like reference symbols throughout the several views, and in which:—

Figure 1 shows a vertical section through the complete machine, the parts being shown in elevation.

Figure 2 is a plan view of the sliding head shown in Figure 1, partly in section, along the line 2—2 of said figure.

Figure 3 is a side elevation of one of the die-rolls showing the matrices cut on one side only.

Figure 4 is a similar view indicating the matrices cut on both sides, parts being shown in dotted lines.

Figure 5 shows an edge view of one of the complete die-rolls partly in section, parts of the cooperating die-rolls being shown in dotted lines; and Figure 6 is a detail view showing the adjustable stop arranged between the intermediate slide and the sliding head.

A represents the housing carrying the various parts of the machine, which housing is provided with a journal bearing A' for the rotating work table and a slide bearing $A^2$ for the sliding head carrying the cutter and guide.

The rotating work table B is provided with a hollow spindle B', connected to the table by webs $b$, and journaled in the antifriction sleeve C in the journal bearing A'. This rotating work table is provided with an annular step or shoulder $B^2$ on which the die-roll blank D is securely held by a key and suitable clamps and bolts on the outer face of the work table, as at $b'$. The rotary work table is also provided with a second step or shoulder $B^3$ on which the master die E is rigidly held by a key and a spacing ring $b^2$.

The master die is provided with matrices which correspond to the exact construction to be duplicated on the finished die roll.

The rotary work table is rotated in any convenient way, as by means of the worm F engaging the annular worm gear G, secured to the work table by means of the bolts $g$, and operated by revolving the worm F as desired by hand or by a power connection governed closely by the hand, as is well known in the machine tool art, and not a part of this invention.

H represents the sliding head having the cylindrical sliding stem H', splined as at h in the bearing A² of the housing A. This sliding head H moves horizontally in and out, and is controlled in conjunction with the rotation of the work table, by the hand and eye of the operator, so that the combined movement keeps the guide head I' snugly and constantly fitted in the matrix of the master die by the combined motion of the rotating table and the sliding head, thus duplicating this matrix on the die-blank. This sliding head H is provided with an internal screw-threaded lug h' adapted to engage the screw I carrying the guide head I'.

The sliding head H may be moved in or out by hand, or by suitable mechanical means. I have shown in Figs. 1 and 2 a suitable arrangement for moving it out by hand, comprising a screw K carrying a hand wheel K', which screw is held by the collars k against longitudinal movement in the lug h° carried by the sliding head H; and said screw engages a nut a° in the bearing A².

The screw I is provided with set collars i, i', which engage the upper portion or bridge m of the intermediate slide M. This slide M is provided with dovetail guides m' engaging in the corresponding guides in the sliding head H, as shown in Fig. 2. This intermediate slide M is also provided with similar guide grooves m² to engage the sliding head N which carries the electric motor N' having the usual leading-in wires marked + and − driving the routing tool O.

The intermediate slide M is provided with an internally screw-threaded lug m³ to engage the screw P, which has set collars p and p' to engage the upper portion or bridge of the sliding head N; thus by turning the screw I the desired vertical adjustment may be imparted to both the guide head I' and the routing tool O; while by turning the screw P the routing tool may be vertically adjusted relative to the guide head I'. Nice adjustment of these two members are desirable in order to secure the desired accuracy.

An adjustable stop should be arranged between the intermediate slide M and the sliding head N. This can be done by casting a lug S² on the side of the intermediate slide M and a similar lug S' on the side of the slide N, and threading the lug S' for the adjusting screw S, as shown in Figure 6.

The operation of the device is as follows:

The master die to be duplicated is put in place on the rotating work table in the position shown in Figure 1, the blank to be formed into a die-roll is then secured on the rotary work table in the position also shown in Figure 1, the said blank having been previously shaped to the desired cross section, such, for instance, as shown at the lower right hand corner of Figure 1.

The work table B and sliding head H are adjusted to bring the guide head I' vertically over and just in contact with the pitch circle or apex of the master die-roll; the centers of the guide head and of the routing tool O are so constructed and arranged that when this is done the routing tool O is vertically over the pitch circle or apex of the die-blank to be cut. The routing tool is then brought down into contact with the apex of the die-blank and the adjustable stop between the slides M and N set so that it cannot be screwed further down.

The head H is then pulled out or shoved in and the guide I' screwed down directly over a matrix in the master die until the router O touches the die-blank. The motor is then started and this screwing down operation is continued until the guide I' is snugly fitted down in the guide matrix. Then a combined movement of the head H and work table B is started, governed by the hand and eye of the operator, to make the guide I' trace and follow the form of the matrix in the master die. This causes the routing tool to cut an exact duplicate of this matrix in the die-blank.

If the depth of the matrix varies, the guide is screwed up or down to follow this depth and make the routing tool follow it.

When one matrix is cut, the guide head I', with the routing tool O, is raised and let down again into the adjoining matrix, and the corresponding matrix in the die blank is similarly cut; this process continuing until all the matrices on one side of the die-roll blank are cut. The guide head with the routing tool is then raised, and the sliding head pushed into a position for cutting the matrices on the other side of the die-roll blank in a similar manner. To finish up the part of the matrix d, shown in Figures 3, 4 and 5, which forms the stud of the link, other and smaller guide heads and routing tools are placed in the machine as required, and used in a similar manner.

In cutting dies for roll-forging, the matrices must have a "draft"; that is, they must be relieved so that the die will leave the forging free. In the process herein described this "draft" is cut in while cutting the matrix by making the routing tool slightly tapered, the large end of the cone being at the top, and by forming the guide head in a similar manner.

As heretofore described, both the master die and the die-roll blank are firmly secured on the work table in their respective steps; this is done by a key or feather, the keyway for which is shown, for instance, at d' in Figures 3 and 4. These keyways are cut in the blanks, and when the blanks are placed on the routing machine to be cut the position of this keyway locates automatically the position of the matrices on the periphery of the die-roll; and this same location is assured when setting the die-roll on its hub for use in the die-rolling mill; thus all of the die-rolls are set for accurate work in relation to each other by these keyways.

It will be seen that with the herein described apparatus the outer surfaces of the die-rolls exactly duplicate the outer surfaces of the master die, and if the master die be properly made there will be practically absolute correspondence in shape between all the matrices.

In the machine I have devised for this purpose:—

(a) There is no laying out by measurements on the surfaces of the cut.

(b) There is no shifting or reversing of the die-roll blank during the whole process.

(c) There is no following of scribed marks by a skilled and trained eye and hand.

(d) There is no chance to spoil an expensive die by accidental undercutting.

(e) Comparatively unskilled operators may be used.

(f) The time to cut the die is greatly decreased.

(g) There is provided a continuous guide, properly proportioned and accurately spaced for the complete periphery of the die-blank to be cut and for all die-blanks for the same size which may be required at any time.

It will be obvious that various modifications, within the scope of the claims might be made in the herein described apparatus and in the construction, combination and arrangement of parts which could be used without departing from the spirit of my invention.

Having thus described my invention, what I claim and desire to secure by Letters Patent of the United States is:—

1. A machine for cutting matrices in the periphery of die-roll blanks, comprising a rotatable work table, a sliding head, and means for moving same parallel to the axis of said work table, a power operated rotary spindle carried by said sliding head and having its axis radial to said work table, and a cutting tool carried by said spindle, substantially as described.

2. A machine for cutting matrices in the periphery of die-roll blanks, comprising a rotatable work table, a master die-roll mounted on the periphery of said work table, a sliding head, and means for moving same parallel to the axis of said work table, a power operated rotary spindle carried by said sliding head and having its axis radial to said work table, and a cutting tool carried by said spindle, with means for causing said cutting tool to follow the contour of the depressions on said master die-roll, substantially as described.

3. A machine for cutting matrices in the periphery of die-roll blanks, comprising a rotatable work table, a sliding head, and means for moving same parallel to the axis of said work table, a series of transverse slides, adjustable relative to each other, carried by said sliding head, a power operated rotary spindle carried by the outer one of said slides and having its axis radial to said work table, and a cutting tool carried by said spindle, substantially as described.

4. A machine for cutting matrices in the periphery of die-roll blanks, comprising a rotatable work table, a master die-roll mounted on the periphery of said work table, a sliding head, and means for moving same parallel to the axis of said work table, a series of transverse slides, adjustable relative to each other, carried by said sliding head, a power operated rotary spindle carried by the outer one of said slides and having its axis radial to said work table, and a cutting tool carried by said spindle, with means for causing said cutting tool to follow the contour of the depressions on said master die-roll, substantially as described.

5. A machine for cutting matrices in the periphery of die-roll blanks, comprising a rotatable work table, a master die-roll mounted on the periphery of said work table, a sliding head, and means for moving same parallel to the axis of said work table, a power operated rotary spindle carried by said sliding head, and having its axis radial to said work table, and a cutting tool carried by said spindle, with a guide head carried by said sliding head and engaging the matrices in said master die-roll, substantialy as described.

6. A machine for cutting matrices in the periphery of die-roll blanks, comprising a rotatable work table, a master die-roll mounted on the periphery of said work table, a sliding head, and means for moving same parallel to the axis of said work table, a series of transverse slides, adjustable relative to each other, carried by said sliding head, a power operated rotary spindle carried by the outer one of said slides and having its axis radial to said work table, and a cutting tool carried by said spindle, with a guide head carried by said sliding head and engaging the matrices in said master die-roll, substantially as described.

In testimony whereof, I affix my signature.

WILLIAM BARNUM COWLES.